(12) United States Patent
Son et al.

(10) Patent No.: US 12,090,113 B2
(45) Date of Patent: Sep. 17, 2024

(54) MASSAGE SYSTEM OF VEHICLE AND METHOD OF CONTROLLING THE SAME

(71) Applicants: Hyundai Motor Company, Seoul (KR); Kia Motors Corporation, Seoul (KR)

(72) Inventors: Joo Hwan Son, Anyang-si (KR); Xiang Lai Nian, Yantai (CN); Hua Chao Wang, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 971 days.

(21) Appl. No.: 17/068,493

(22) Filed: Oct. 12, 2020

(65) Prior Publication Data

US 2022/0040034 A1 Feb. 10, 2022

(30) Foreign Application Priority Data

Aug. 7, 2020 (CN) .......................... 202010789348.9

(51) Int. Cl.
*A61H 23/02* (2006.01)
*B06B 1/16* (2006.01)
(Continued)

(52) U.S. Cl.
CPC ......... *A61H 23/0254* (2013.01); *B06B 1/167* (2013.01); *B60N 2/976* (2018.02);
(Continued)

(58) Field of Classification Search
CPC ........ A61H 23/0254; A61H 2201/1418; A61H 2201/1669; A61H 2201/1671; A61H 2203/0431; A61H 2201/1633; A61H 2201/1664; A61H 2230/105; A61H 15/0078; A61H 2015/0014;
(Continued)

(56) References Cited

U.S. PATENT DOCUMENTS 5,088,474 A * 2/1992 Mabuchi ................ A61H 7/001
601/110
6,312,400 B1 11/2001 Itikawa et al.
(Continued)

FOREIGN PATENT DOCUMENTS

CN 201019988 Y 2/2008
CN 101453975 A 6/2009
(Continued)

*Primary Examiner* — Justine R Yu
*Assistant Examiner* — Matthew R Moon
(74) *Attorney, Agent, or Firm* — Slater Matsil, LLP

(57) ABSTRACT

A massage system for a seat of a vehicle includes a drive motor, a sliding member having a hollow pillar shape, a first end of the sliding member being blocked by a plate member and a second end of the sliding member being opened, a housing member having a hollow pillar shape, a first end of the housing member being blocked by a partition and a second end of the housing member being opened, and a drive gear module operably connected to the drive motor, wherein at least one roller member is extended toward the housing member at an edge of the plate member, and at least one cam protruding toward the sliding member is formed at a circumference of the partition, wherein a cam profile is formed at a surface of the cam.

16 Claims, 14 Drawing Sheets

(51) Int. Cl.
*B60N 2/90* (2018.01)
*F16H 37/12* (2006.01)
*H02K 7/116* (2006.01)

(52) U.S. Cl.
CPC ......... *F16H 37/124* (2013.01); *H02K 7/1166* (2013.01); *A61H 2201/1418* (2013.01); *A61H 2201/1669* (2013.01); *A61H 2201/1671* (2013.01); *A61H 2203/0431* (2013.01); *F16H 2702/00* (2013.01)

(58) Field of Classification Search
CPC .... A61H 2201/0149; A61H 2201/1215; A61H 2201/5064; A61H 7/007; A61H 2015/0042; A61H 2201/1207; A61H 2205/081; A61H 2205/086; A61H 2205/108; A61H 2230/625; A61H 2201/1223; A61H 2201/50; B06B 1/167; B60N 2/976; B60N 2/02246; B60N 2/02253; B60N 2/00; F16H 37/124; F16H 2702/00; H02K 7/1166; A61B 5/1103; A61B 5/168; A61B 5/18; A61B 2503/22; B60R 16/037
See application file for complete search history.

(56) References Cited

U.S. PATENT DOCUMENTS

| | | | | |
|---|---|---|---|---|
| 6,408,951 | B1 * | 6/2002 | Lin | H02G 1/005 |
| | | | | 173/205 |
| 7,311,681 | B1 * | 12/2007 | Vaccarella | A61H 23/0263 |
| | | | | 601/49 |
| 2003/0028134 | A1 | 2/2003 | Lev et al. | |
| 2006/0049678 | A1 | 3/2006 | Kern et al. | |
| 2007/0239090 | A1 | 10/2007 | Mitea | |
| 2010/0179456 | A1 * | 7/2010 | Chen | A61H 23/02 |
| | | | | 601/18 |
| 2018/0093595 | A1 | 4/2018 | Kim et al. | |
| 2019/0092204 | A1 | 3/2019 | Mergl et al. | |
| 2020/0139870 | A1 | 5/2020 | Mergl et al. | |
| 2020/0315910 | A1 | 10/2020 | Yamaguchi | |

FOREIGN PATENT DOCUMENTS

| | | | | |
|---|---|---|---|---|
| CN | 201619475 | U | 11/2010 | |
| CN | 107244269 | A | 10/2017 | |
| CN | 107349079 | A | 11/2017 | |
| CN | 107914612 | A | 4/2018 | |
| CN | 108119685 | A | 6/2018 | |
| CN | 108567570 | A | 9/2018 | |
| CN | 209500208 | U | 10/2019 | |
| CN | 110538053 | A | 12/2019 | |
| JP | 2000300630 | A | 10/2000 | |
| JP | 2009089872 | A | 4/2009 | |
| JP | 2014176433 | A | 9/2014 | |
| JP | 2017209344 | A | 11/2017 | |
| KR | 20030024182 | A | 3/2003 | |
| KR | 101440088 | B1 | 9/2014 | |
| KR | 20180038022 | A | 4/2018 | |
| KR | 20180075274 | A | 7/2018 | |
| KR | 20190054469 | A | 5/2019 | |
| TW | 402499 | B | 8/2000 | |
| WO | WO-2004039303 | A1 * | 5/2004 | ......... A61H 23/0254 |
| WO | WO-2014181959 | A1 * | 11/2014 | ........... F16H 25/125 |

* cited by examiner

FIG. 10A
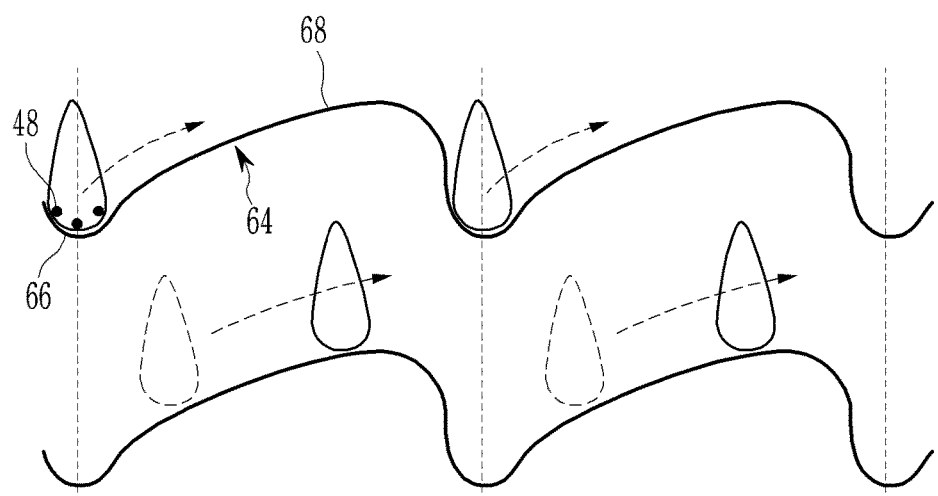
FIG. 10B
FIG. 10C
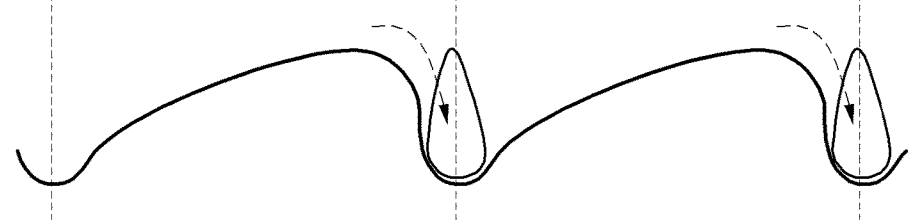

MASSAGE SYSTEM OF VEHICLE AND METHOD OF CONTROLLING THE SAME

CROSS-REFERENCE TO RELATED APPLICATIONS

This application claims priority to and the benefit of Chinese Patent Application No. 202010789348.9 filed in the Chinese National Intellectual Property Administration on Aug. 7, 2020, the entire contents of which are incorporated herein by reference.

TECHNICAL FIELD

The present invention relates to a massage system of a vehicle and a method of controlling the same. In particular embodiments, the present invention relates to a massage system of a vehicle and a method of controlling the same which ensures sufficient massage pressure by applying a mechanical massage device, while preventing an occupant from feeling uncomfortable when sitting on a seat.

BACKGROUND

Recently, as the spread of autonomous vehicles has increased, indoor activities of occupants in the autonomous vehicles have increased. Particularly, demands of customers to take a break in the vehicle are increasing, and massage devices have been mounted in the vehicle to meet these demands of the customers.

The massage device is mainly mounted on a seat of the vehicle, and classified into a mechanical massage device and a pneumatic massage device. The mechanical massage device applies massage pressure on a back of an occupant using a mechanical mechanism such as a roller, whereas the pneumatic massage device applies the massage pressure on the back of the occupant using pneumatic pressure. Since the occupant may feel uncomfortable by the mechanism such as the roller of the mechanical massage device when sitting on the seat, the pneumatic massage device is mainly used in the vehicle. However, since the massage pressure of the pneumatic massage device is not sufficient, the massage effect is not great. In addition, since various parts such as pneumatic valves are required in the pneumatic massage device, the price is high.

The above information disclosed in this Background section is only for enhancement of understanding of the background of the invention, and therefore it may contain information that does not form the prior art that is already known to a person of ordinary skill in the art.

SUMMARY

The present invention has been made in an effort to provide a massage system of a vehicle and a method of controlling the same having advantages of ensuring sufficient massage pressure by applying a mechanical massage device, while preventing an occupant from feeling uncomfortable when sitting on a seat.

A massage system of a vehicle according to an exemplary embodiment of the present invention may include a massage unit mounted at one or more among a plurality of mount positions in a seat of the vehicle and configured to apply a massage pressure to a seated occupant, and a drive motor operably connected to the massage unit to provide a torque to the massage unit. The massage unit may include a sliding member having a hollow pillar shape, one end of the sliding member being blocked by a plate member and the other end of the sliding member being opened, a housing member having a hollow pillar shape, one end of the housing member being blocked by a partition and the other end of the housing member being opened, and a drive gear module operably connected to the drive motor to receive the torque of the drive motor and to provide the torque to one of the sliding member and the housing member in order to rotate the one of the sliding member and the housing member. At least one roller member may be extended toward the housing member at an edge of the plate member, and at least one cam protruding toward the sliding member may be formed at a circumference of the partition. A cam profile may be formed at a surface of the cam facing toward the sliding member along a circumference direction of the cam, and the roller member may move on the cam profile when the sliding member or the housing member rotates such that the sliding member is moved towards or away from the seated occupant.

At least one bearing may be provided at a free end portion of the roller member contactable on the cam profile.

A first pillar may extend toward the housing member from a central portion of the plate member, the drive gear module may be provided with a second pillar extending toward the sliding member, and the second pillar may penetrate through the partition and be connected to the first pillar to be capable of transmitting the torque to the first pillar.

The first pillar and the second pillar may be coupled to be capable of transmitting the torque to each other and sliding with each other.

The drive gear module may include a drive gear, the drive motor may include a motor shaft formed with a worm, and the drive gear and the worm may be coupled in a way of a worm gear.

The massage system may further include a power supply circuit for supplying electric power to the drive motor. When the drive motor supplies the torque to the drive gear module, the sliding member is configured to reciprocate between a first position closest to the seated occupant and a second position farthest from the seated occupant The power supply circuit is configured to stop the drive motor only when the sliding member is positioned at the second position.

The cam profile may be defined by a displacement from the partition to the surface of the cam and may include a valley portion and a peak portion, wherein the displacement increases along a predetermined curved line from the valley portion to the peak portion and decreases along a predetermined curved line from the peak portion to a valley portion of a neighboring cam profile in one cam profile such that the cam profile is formed convex toward the sliding member.

The power supply circuit may include a position determining module connecting a power supply to the drive motor when the roller member is positioned at a position other than the valley portion on the cam profile, and disconnecting the power supply from the drive motor when the roller member is positioned at the valley portion on the cam profile.

The position determining module may include first and second parts connected to the motor shaft to rotate with the motor shaft and electrically isolated from each other, a first terminal electrically connecting the power supply to the first part, and a second terminal contactable with the first part or the second part according to the rotation of the motor shaft to electrically connect the power supply to the first part or the second part. The second terminal contacts with the first part to connect the power supply to the drive motor when the roller member is positioned at the position other than the valley portion on the cam profile, and the second terminal contacts with the second part to disconnect the power supply from the drive motor when the roller member is positioned on the valley portion on the cam profile.

The power supply circuit may further include an operation switch including an ON terminal and an OFF terminal. The ON terminal is capable of directly connecting the power supply to the drive motor and the OFF terminal is capable of connecting the power supply to the drive motor through the position determining module.

The massage system may further include a controller controlling an operation of the drive motor, wherein the controller is configured to connect the power supply to the ON terminal at a relax mode.

The controller is configured to connect the power supply to the OFF terminal at a mode other than relax mode.

The roller member is always positioned at the valley portion on the cam profile at the mode other than the relax mode.

According to another exemplary embodiment of the present invention, a method of controlling a massage system which includes a massage unit including a sliding member formed with at least one roller member, a housing member including at least one cam, each being formed of a cam profile on which each roller is movable, and a drive gear module capable of transmitting a torque to the sliding member, and a drive motor capable of transmitting the torque to the drive gear module is disclosed. The cam profile includes a valley portion and a peak portion and has a shape protruding convex toward the sliding member.

The massage system may further include a position determining module including first and second parts electrically isolated from each other, a first terminal electrically connecting a power supply to the first part, and a second terminal capable of contacting with the first part or the second part according to a rotation of the drive motor, an operation switch including an ON terminal directly connecting the power supply to the drive motor and an OFF terminal connecting the power supply to the drive motor through the position determining module, a sensor configured to detect a parameter related to drowsy driving of a driver, and a controller configured to determine whether the driver is drowsy driving based on the parameter and control an operation of the drive motor through the operation switch.

The method may include determining, by the controller, whether the driver is drowsy driving, and entering, by the controller, a relax mode when the driver is drowsy driving, wherein the controller connects the power supply to the ON terminal of the operation switch to operate the drive motor at the relax mode.

The method may further include stopping the relax mode when the OFF terminal is selected by a user or a predetermined relax mode stop condition is satisfied, wherein the controller connects the power supply to the OFF terminal of the operation switch at the stopping the relax mode.

The OFF terminal is configured to connect the power supply to the position determining module, wherein the second terminal is capable of contacting with the first part to connect the power supply to the drive motor when the roller member is positioned at a position other than the valley portion on the cam profile, and the second terminal is capable of contacting the second part to disconnect the power supply from the drive motor when the roller member is positioned at the valley portion on the cam profile.

The roller member may always be positioned at the valley portion on the cam profile when the relax mode is stopped.

According to exemplary embodiments of the present invention, the massage protrusion of the sliding member applies massage pressure to a user's body by rotation of the drive motor, thereby ensuring sufficient massage pressure. Accordingly, massage effect can be maximized.

In addition, according to exemplary embodiments of the present invention, operation of the massage system is stopped only when the sliding member is positioned farthest from the user's body, thereby minimizing discomfort of the occupant when seated.

In addition, according to exemplary embodiments of the present invention, safety of the occupant can be secured by automatically massaging the driver during drowsy driving and relieving the driver's fatigue.

In addition, other effects of exemplary embodiments of the present invention should be explicitly or implicitly described in the description provided herein. Various effects predicted according to the exemplary embodiments of the present invention will be disclosed in the description provided herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 10, which includes FIG. 10A, FIG. 10B, and FIG. 10C, is a schematic diagram exemplarily illustrating movement of a roller member in a massage device according to an exemplary embodiment of the present invention;

Figure 1:
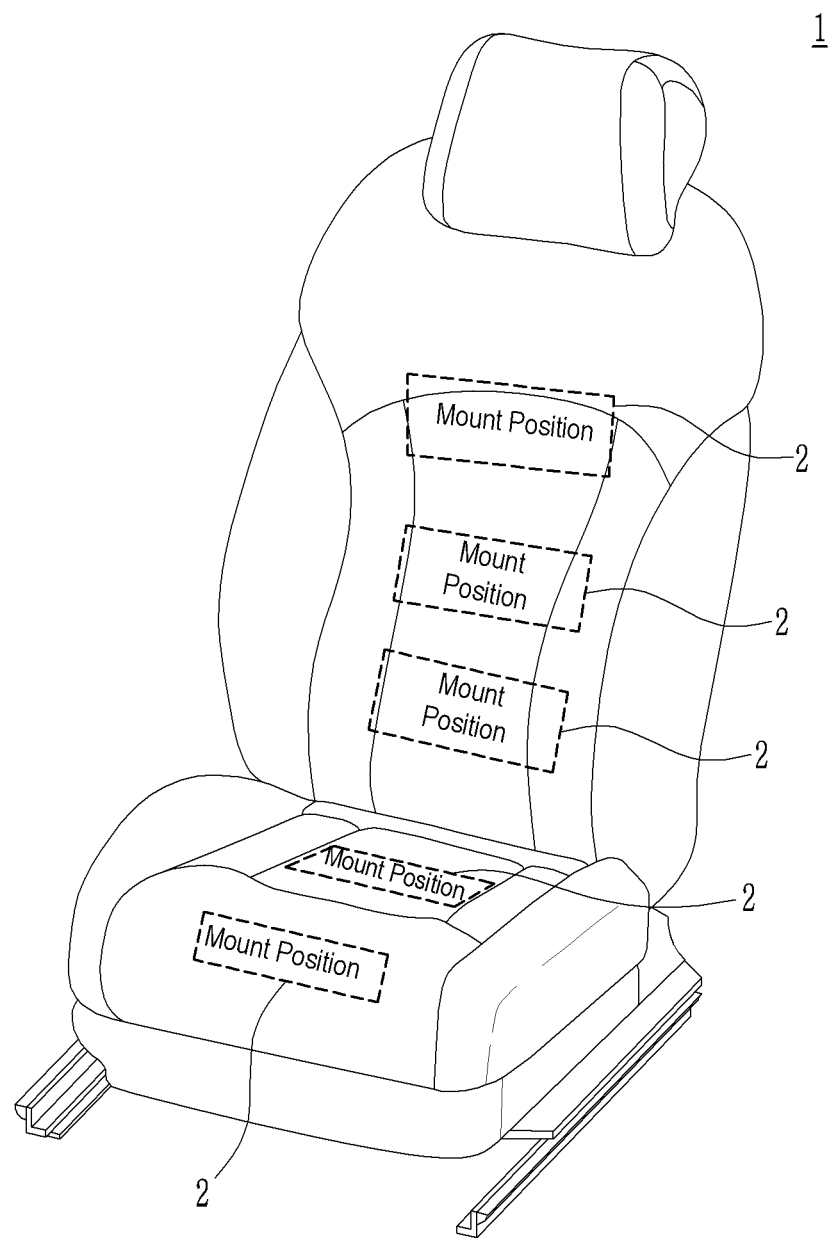
FIG. 1 is a schematic diagram showing examples of mount positions in a seat at which a massage device according to an exemplary embodiment of the present invention can be mounted.

It should be understood that the above-referenced drawings are not necessarily to scale, presenting a somewhat simplified representation of various preferred features illustrative of the basic principles of the invention. The specific design features of the present invention, including, for example, specific dimensions, orientations, locations, and shapes, will be determined in part by the particular intended application and use environment.

DETAILED DESCRIPTION OF ILLUSTRATIVE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and the like. In addition, a vehicle includes an autonomous vehicle.

The term "autonomous vehicle" or other similar term as used herein generally includes a vehicle that supports an autonomous driving mode at which a vehicle can move for itself without manipulation of a driver.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of embodiments of the present invention may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 2:
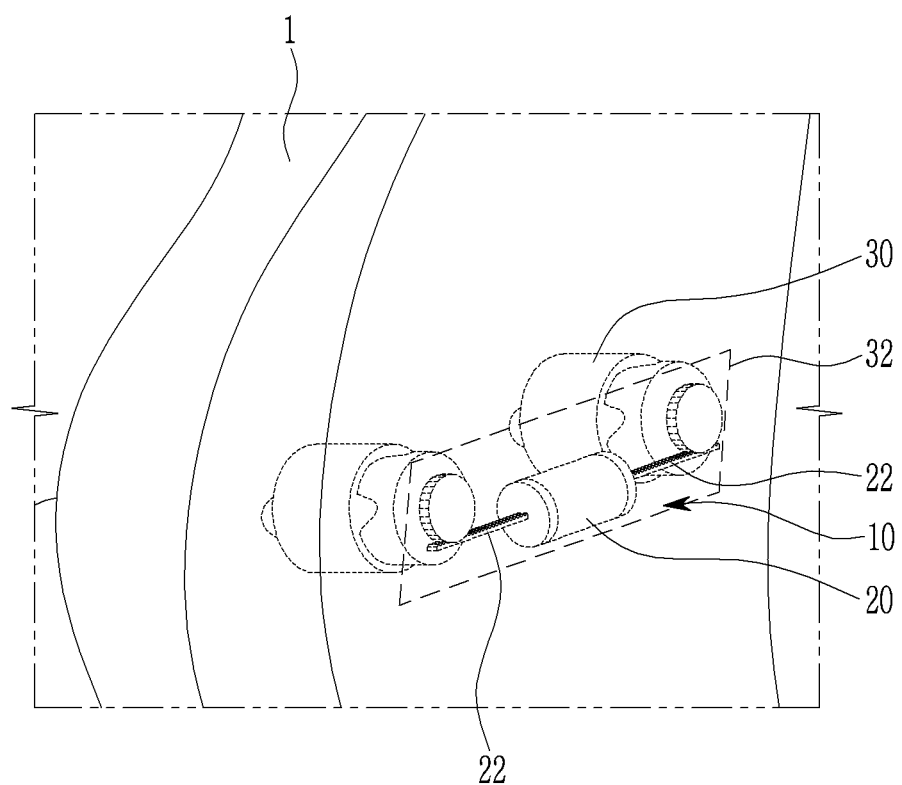
FIG. 2 is a schematic diagram exemplarily showing that a massage device according to an exemplary embodiment of the present invention is mounted in a seat.

FIG. 1 is a schematic diagram showing examples of mount positions in a seat at which a massage device according to an exemplary embodiment of the present invention can be mounted; FIG. 2 is a schematic diagram exemplarily showing that a massage device according to an exemplary embodiment of the present invention is mounted in a seat; and FIG. 3 is another schematic diagram exemplarily showing that a massage device according to an exemplary embodiment of the present invention is mounted in a seat.

Figure 3:
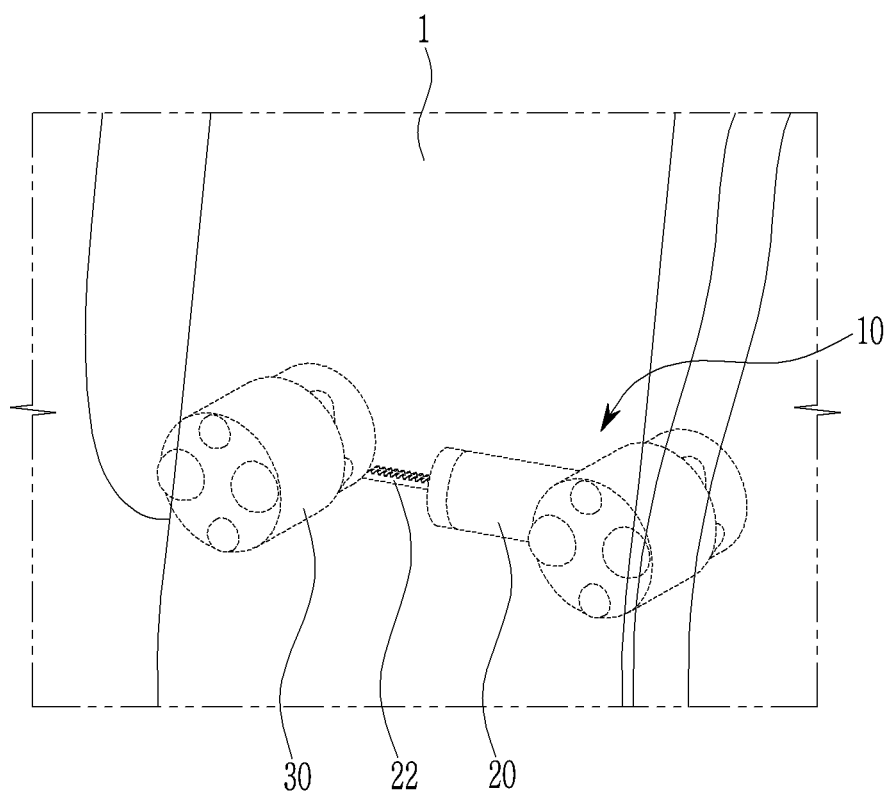
FIG. 3 is another schematic diagram exemplarily showing that a massage device according to an exemplary embodiment of the present invention is mounted in a seat.

As shown in FIG. 1 to FIG. 3, a massage device 10 according to an exemplary embodiment of the present invention is mounted in a seat 1 of a vehicle. The seat 1 is mounted in the vehicle, for example, an autonomous vehicle, and includes a plurality of mount positions 2. The plurality of mount positions 2 may be, for example, positions of the seat 1 corresponding to a back, a hip, or a thigh of a seated occupant. The massage device 10 may be mounted at one of more of the plurality of mount positions 2. FIG. 2 and FIG. 3 exemplarily show the massage device 10 mounted at one mount position 2 of the seat 1.

As shown in FIG. 2 and FIG. 3, the massage device 10 includes a drive motor 20, a massage unit 30, and a supporting frame 32. FIG. 2 and FIG. 3 exemplarily show that two massage units 30 are operably connected to one drive motor 20, but the number of the massage units 30 operably connected to one drive motor 20 is not limited to two. That is, at least one massage unit 30 may be operably connected to one drive motor 20. Here, the term "operably connected" or a similar term means that at least two members are directly or indirectly connected to each other to transmit power to each other.

The drive motor 20 is operably connected to the massage unit 30 to transmit power to the massage unit 30. The drive motor 20, as well known to a person of an ordinary skill in the art, includes a stator and a rotor in a motor housing 21 (see FIG. 11), and further includes a motor shaft 22 connected to the rotor. In addition, the drive motor 20 further includes a position determining module 25 mounted in the motor housing 21 (see FIG. 11).

Some components of the massage unit 30 move toward the seated occupant to apply massage pressure to the seated occupant or move away from the seated occupant to release the massage pressure by the power received from the drive motor 20. Application and release of the massage pressure can be periodically repeated. The massage unit 30 can be fixed to the mount position 2 in the seat 1 through the supporting frame 32. In addition, the supporting frame 32 may support a plurality of massage units 30.

The massage unit 30 according to an exemplary embodiment of the present invention will hereinafter be described in further detail.

Figure 4:
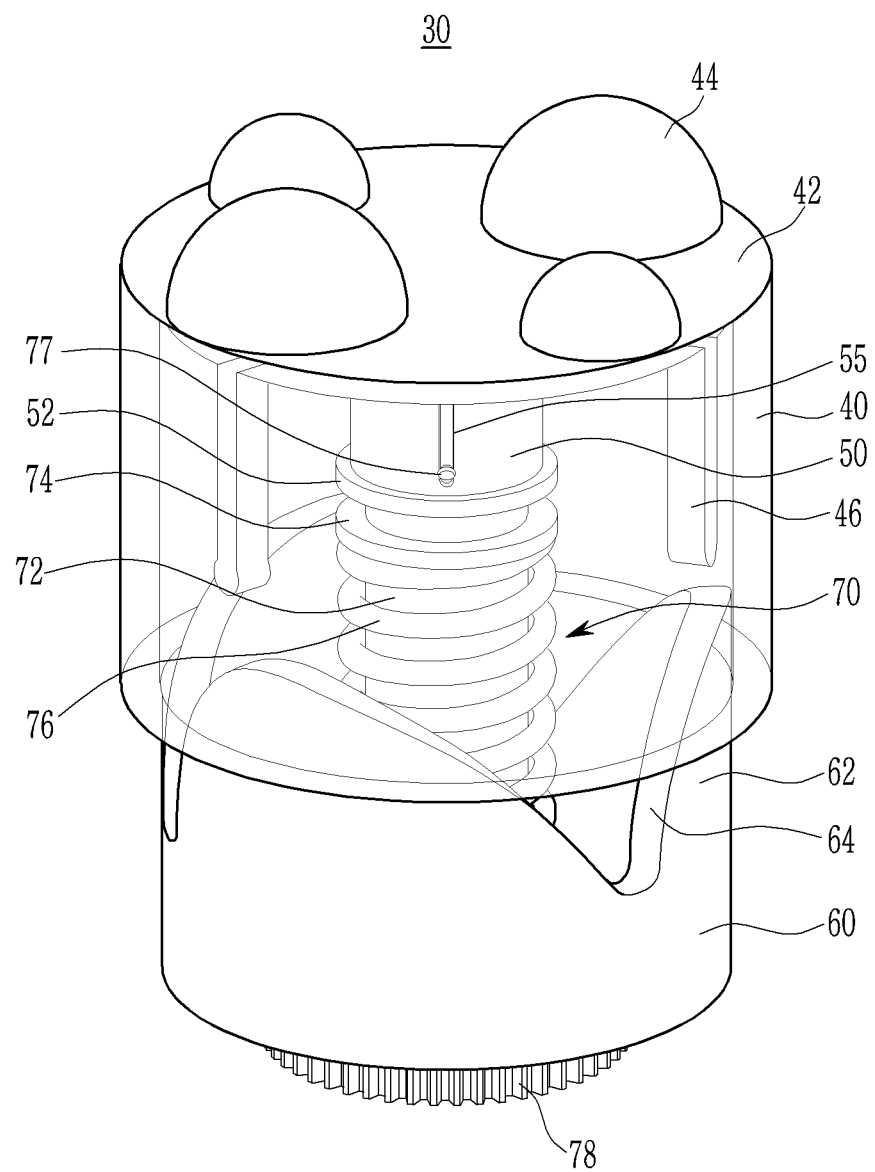
FIG. 4 is a schematic diagram of a massage unit according to an exemplary embodiment of the present invention.
Figure 5:
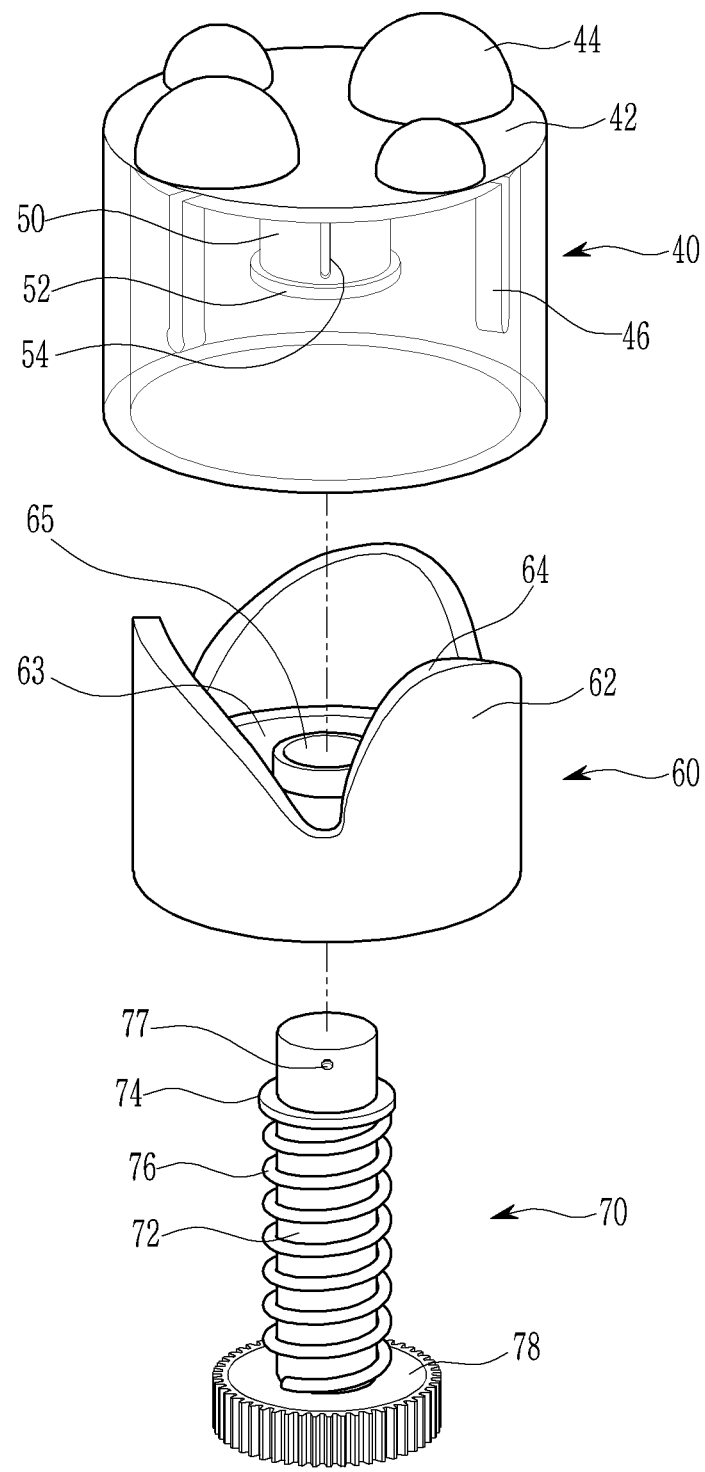
FIG. 5 is an exploded view of a massage unit according to an exemplary embodiment of the present invention.
Figure 6:
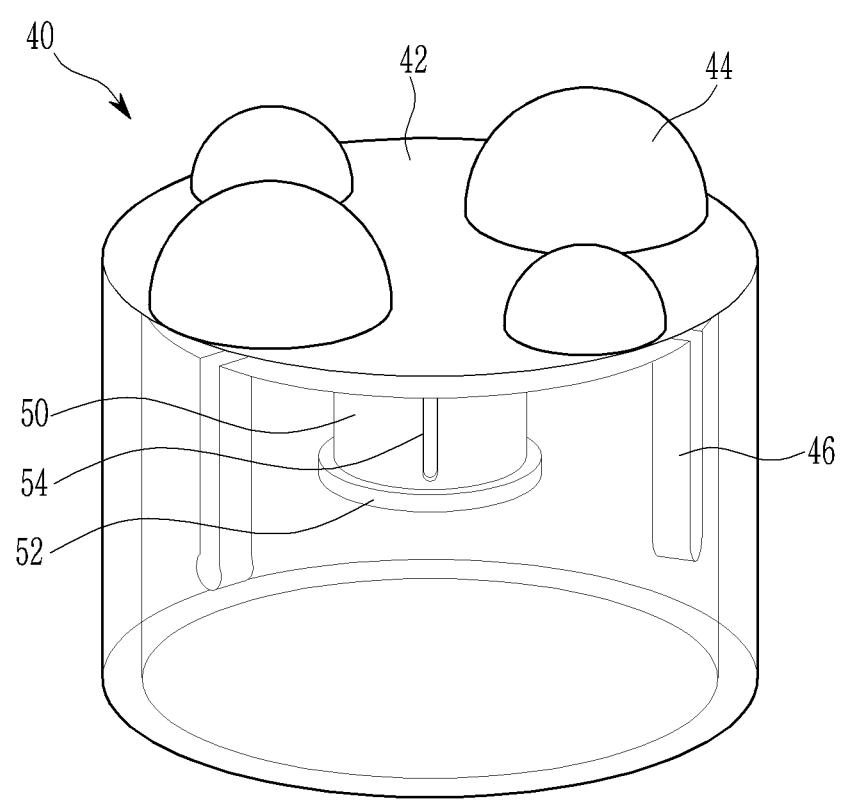
FIG. 6 is a schematic diagram of a sliding member according to an exemplary embodiment of the present invention.
Figure 7:
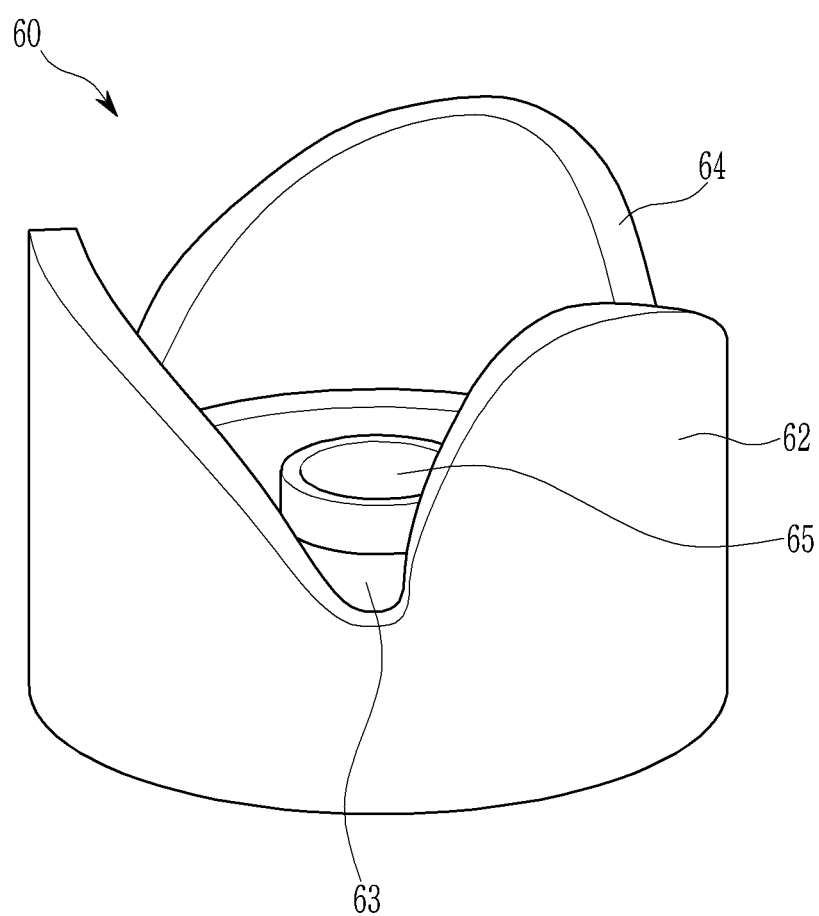
FIG. 7 is a schematic diagram of a housing member according to an exemplary embodiment of the present invention.
Figure 8:
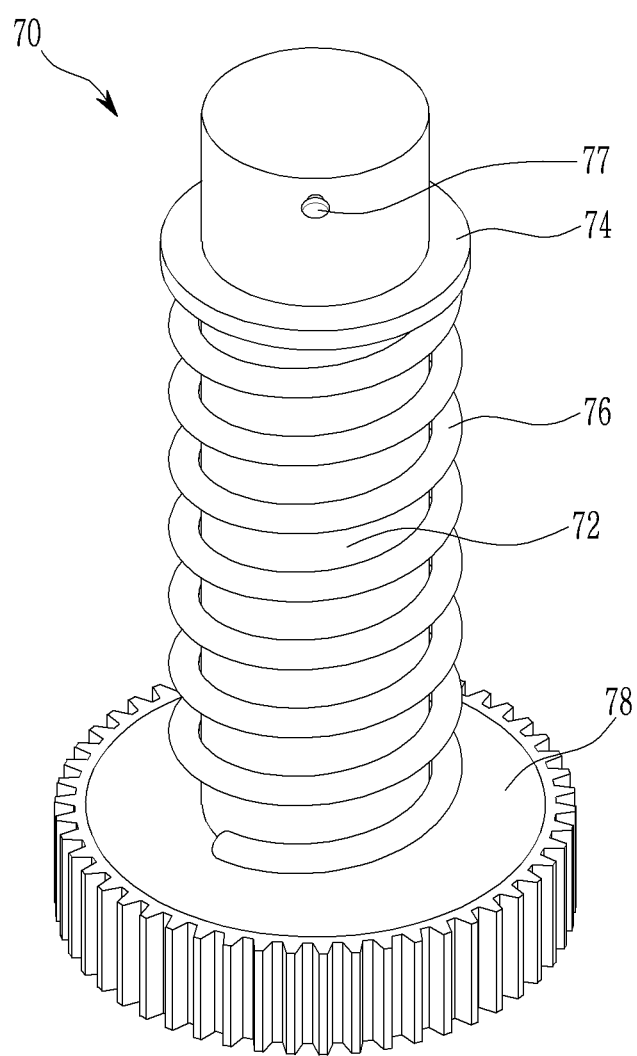
FIG. 8 is a schematic diagram of a drive gear module according to an exemplary embodiment of the present invention.

FIG. 4 is a schematic diagram of a massage unit according to an exemplary embodiment of the present invention; FIG. 5 is an exploded view of a massage unit according to an exemplary embodiment of the present invention; FIG. 6 is a schematic diagram of a sliding member according to an exemplary embodiment of the present invention; FIG. 7 is a schematic diagram of a housing member according to an exemplary embodiment of the present invention; and FIG. 8 is a schematic diagram of a drive gear module according to an exemplary embodiment of the present invention.

As shown in FIG. 4 and FIG. 5, the massage unit 30 includes a sliding member 40, a housing member 60, and a drive gear module 70.

As shown in FIG. 4 to FIG. 6, the sliding member 40 is configured to move toward the seated occupant or away from the seated occupant by the power received from the drive motor 20. The sliding member 40 has a hollow cylindrical shape, but is not limited thereto. A first end of the sliding member 40 (e.g., an end facing the seated occupant) is blocked by a plate member 42, and a second end opposite the first end is opened. At least one massage protrusion 44 is formed at a first surface of the plate member 42 (e.g., a surface facing the seated occupant). The massage protrusion 44 applies the massage pressure to the seated occupant. It is exemplarily illustrated in FIG. 4 that four massage protrusions 44 is formed and each massage protrusion 44 has a hemispherical shape, but the number of the massage protrusions 44 is not limited to four and the shape of the massage protrusion 44 is not limited to the hemispherical shape. At least one roller member 46 and a first pillar 50 are formed at a second surface of the plate member 42 (opposite the first surface). The at least one roller member 46 is formed at an edge of the second surface of the plate member 42, spaced from each other circumferentially, and extends toward the other side. At least one bearing 48 is provided at the other end portion of the roller member 46 (see FIG. 10(a)). It is exemplified in the drawings that three roller members 46 are provided, but the number of the roller members 46 is not limited to three. The first pillar 50 has a cylindrical shape and extends from a central portion of the second surface of the plate member 42 to the other side. A first stopper 52 is formed at the other end of the first pillar 50 and a diameter of the first stopper 52 may be larger than that of the first pillar 50.

As shown in FIGS. 4, 5 and 7, the housing member 60 has a cylindrical shape, but is not limited thereto. A first end of the housing member 60 (e.g., an end facing the seated occupant) is blocked by a partition 63, and a second end opposite the first end is opened. An exterior diameter of the housing member 60 is smaller than an interior diameter of the sliding member 40 so that at least part of the housing member 60 can be inserted in the sliding member 40. In some exemplary embodiments, a radius of the housing member 60 may correspond to a radial distance from a center of the sliding member 40 to the roller member 46.

At least one cam 62 is protruded from a circumference of a surface of the partition 63 toward the one side along a circumference direction. The number of the cams 62 corresponds to the number of the roller members 46. A cam profile 64 having a predetermined shape is formed at one surface of the cam 62 (e.g., an end facing the seated occupant). That is, the cam profile 64 can be defined by a displacement from the partition 63 to the surface of the cam 62. In some exemplary embodiments, as shown in FIG. 10, the cam profile 64 includes a valley portion 66 and a peak portion 68, and has a shape such that the displacement increases along a predetermined curved line from the valley portion 66 to the peak portion 68 and then decreases along a predetermined curved line from the peak portion 68 to a valley portion 66 of the neighboring cam profile 64. That is, the cam profile 64 may be formed convex toward the seated occupant. The other end portion of the roller member 46 can move on the cam profile 64. Therefore, the sliding member 40 moves toward the seated occupant corresponding to the cam profile 64 to apply the massage pressure to the seated occupant or moves away from the seated occupant to release the massage pressure. That is, when the other end portion of the roller member 46 moves on the cam profile 64, the sliding member 40 is configured to reciprocate between a first position closest to the seated occupant and a second position farthest from the seated occupant. The first position is a position corresponding to where the roller member 46 is positioned at the peak portion 68 on the cam profile 64, and the second position is a position corresponding to where the roller member 46 is positioned at the valley portion 66 on the cam profile 64. The bearing 48 provided at the roller member 46 allows the roller member 46 to move smoothly on the cam profile 64. A length of the roller member 46 may be longer than a distance in a length direction from the valley portion 66 to the peak portion 68 so that the roller member 46 can move smoothly on the cam profile 64. In addition, in order to prevent the sliding member 40 from separating from the housing member 60 during operation of the massage device 10, a length of the sliding member 40 is greater than a sum of the length of the roller member 46 and the distance in the length direction from the valley portion 66 to the peak portion 68. Thus, even if the roller member 46 is positioned at the peak portion 68 of the cam profile 64, at least a portion of the housing member 60 is positioned within the sliding member 40, thereby preventing the sliding member 40 from escaping from the housing member 60.

A penetration hole 65 is formed at a central portion of the partition 63.

As shown in FIGS. 4, 5 and 8, the drive gear module 70 includes a drive gear 78 and a second pillar 72 of cylindrical shape extending from the drive gear 78 to the one side.

Figure 9:
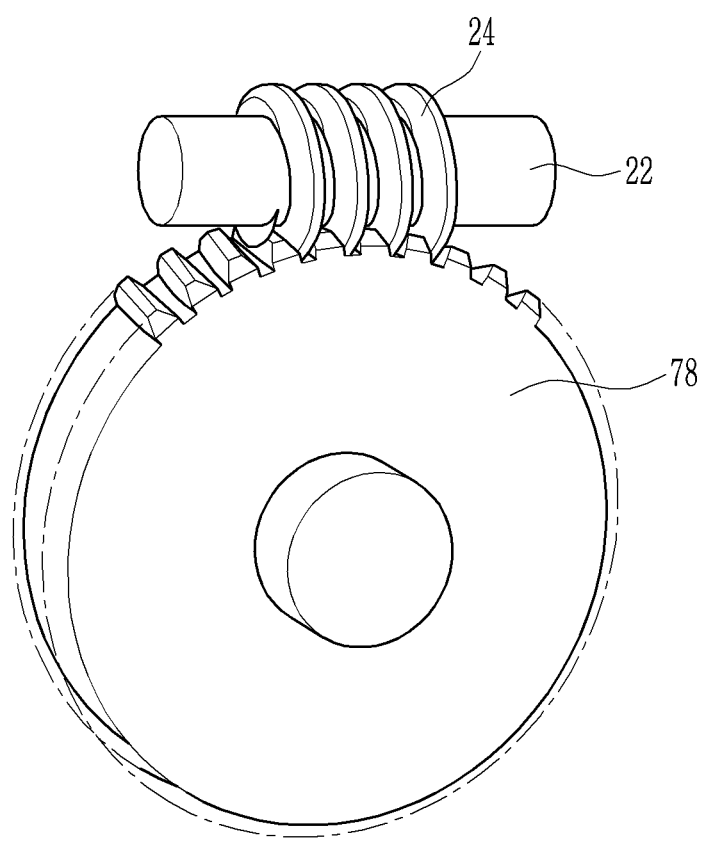
FIG. 9 is a schematic diagram exemplarily illustrating a coupling way of the drive gear and the motor shaft.

The drive gear 78 is operably connected to the drive motor 20 to receive the power from the drive motor 20. For this purpose, as shown in FIG. 9, a worm 24 is formed on the motor shaft 22, a plurality of teeth is formed at an exterior circumference of the drive gear 78, and the worm 24 and the teeth are coupled in a way of worm gear.

The second pillar 72 is fixed to a surface of the drive gear 78, an annular second stopper 74 may be formed at a middle portion of the second pillar 72 in the length direction, and the second stopper 74 abuts the first stopper 52 when the other end portion of the roller member 46 is positioned at the valley portion 66. The second pillar 72 penetrates through the penetration hole 65 and is protruded to the one side.

An exterior diameter of the second pillar 72, e.g., at least an exterior diameter of the one end portion of the second pillar 72, may be substantially the same as or slightly smaller than an interior diameter of the first pillar 50. Therefore, the one end portion of the second pillar 72 can be inserted in the first pillar 50. In addition, the first pillar 50 and the second pillar 72 can be coupled to be capable of transmitting torque to each other and sliding with each other. For example, a slot 54 is formed at the first pillar 50 in the length direction, and a slider 77 detachably attached to the second pillar 72 is disposed in the slot 54 so that the slider 77 can slide in the slot 54 in the length direction. In another example, a plurality of teeth is formed at an exterior circumference of the one end portion of the second pillar 72 in the length direction, a plurality of teeth is formed at an interior circumference of the first pillar 50 in the length direction, and the teeth of the second pillar 72 and the teeth of the first pillar 50 can be splined to each other. In another example, a diameter of the first pillar 50 is the same as or substantially similar to that of the second pillar 72, a plurality of pins extends from a facing surface of one of the first and second pillars 50 and 72 toward the other of the first and second pillars 50 and 72 in the length direction, and a plurality of pin holes into which the plurality of pins can be inserted and slide in the length direction is formed at a facing surface of the other of the first and second pillars 50 and 72. The coupling of the first pillar 50 and the second pillar 72 is not limited to these examples, but the first pillar 50 and the second pillar 72 may be coupled in such way, known to a person of an ordinary skill in the art, that the torque can be transmitted between two members and the two members can slide to each other. In some exemplary embodiments, the first pillar 50 can be inserted in the second pillar 72. In these examples, the slot 54 is formed at the second pillar 72 in the length direction or the plurality of teeth is formed at an interior circumference of the second pillar 72 in the length direction, and the slider 77 is detachably attached to the first pillar 50 or the plurality of teeth is formed at an exterior circumference of the first pillar 50 in the length direction.

The sliding member 40 can receive the torque from the drive gear module 70 to be rotated due to coupling of the first pillar 50 and the second pillar 72. If the sliding member 40 rotates, the roller member 46 moves on the cam profile 64, and therefore, the sliding member 40 can move forward to the one side or move backward to the other side. That is, the sliding member 40 can rotate and simultaneously move forward or backward in the length direction. Accordingly, the massage protrusion 44 can apply the massage pressure to and rub a body of the seated occupant simultaneously, thereby improving massage effect.

The massage unit 30 further includes an elastic member 76. The elastic member 76 is disposed between the drive gear module 70 and the sliding member 40 to apply elastic force to the sliding member 40 to the other side in the length direction. In further detail, one end of the elastic member 76 is attached to the first pillar 50, e.g., the first stopper 52 and the other end of the elastic member 76 is attached to the drive gear module 70, e.g., the drive gear 78. Therefore, the elastic member 76 provides the elastic force pulling the sliding member 40 to the other side in the length direction when the roller member 46 moves from the peak portion 68 to the valley portion 66 on the cam profile 64.

Operation of the massage device 10 according to an exemplary embodiment of the present invention will hereinafter be described in detail.

FIG. 10, which includes FIG. 10A, FIG. 10B, and FIG. 10C, is a schematic diagram exemplarily illustrating movement of a roller member in a massage device according to an exemplary embodiment of the present invention.

As shown in FIG. 10A, when the massage device 10 is not operated, the roller member 46 is positioned at the valley portion 66 on the cam profile 64 (i.e., the sliding member 40 is positioned at the second position). At this state, if a relax mode is initiated by a user's request or satisfaction of a predetermined condition, the drive motor 20 is operated. The torque of the drive motor 20 is transmitted to the sliding member 40 through the drive gear module 70, and therefore the sliding member 40 rotates. When the sliding member 40 rotates, the roller member 46 moves from the valley portion 66 to the peak portion 68 on the cam profile 64 (i.e., the sliding member 40 moves from the second position to the first position), as shown in FIG. 10B. Therefore, the massage protrusion 44 applies the massage pressure to and rubs the body of the seated occupant simultaneously.

If the drive motor 20 continuously rotates, the roller member 46 moves from the peak portion 68 to the valley portion 66 on the cam profile 64 (i.e., the sliding member 40 moves from the first position to the second position FIG. 10C. Therefore, the massage pressure applied to the body of the occupant decreases.

Until the drive motor 20 stops, the roller member 46 performs the movement from the valley portion 66 to the peak portion 68 and the movement from the peak portion 68 to the valley portion 66 on the cam profile 64, and then moves to the neighboring cam 62 and repetitively performs the movements.

When the relax mode is stopped, the drive motor 20 is stopped and the massage device 10 is not operated. If the drive motor 20 is stopped in a state that the roller member 46 is positioned at the peak portion 68 on the cam profile 64, the seated occupant may feel discomfort. In order to minimize this discomfort, the drive motor 20 is configured to stop only when the roller member 46 is positioned at the valley portion 66 on the cam profile 64 (i.e., only when the sliding member 40 is positioned at the second position). To this end, the drive motor 20 includes the position determining module 25.

Figure 11:
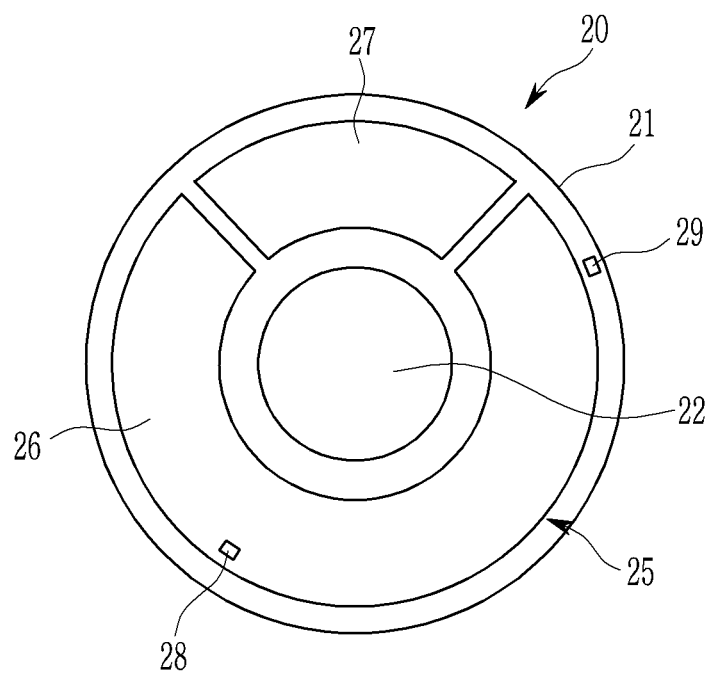
FIG. 11 is a schematic diagram exemplarily illustrating a position determining module according to an exemplary embodiment of the present invention.
Figure 12:
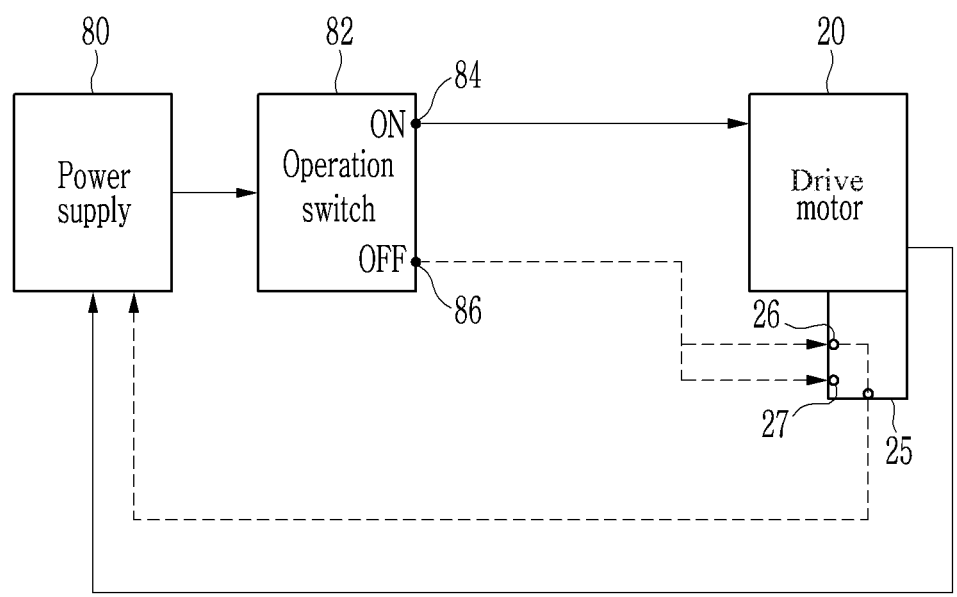
FIG. 12 is a schematic diagram exemplarily illustrating a power supply circuit for supplying electric power to a massage system according to an exemplary embodiment of the present invention.

FIG. 11 is a schematic diagram exemplarily illustrating a position determining module according to an exemplary embodiment of the present invention; and FIG. 12 is a schematic diagram exemplarily illustrating a power supply circuit for supplying electric power to a massage system according to an exemplary embodiment of the present invention.

As shown in FIG. 11, the position determining module 25 is connected to the motor shaft 22 and rotates with the motor shaft 22. In addition, when the drive motor 20 rotates one revolution, the roller member 46 completely sweeps the cam profile 64 of one cam 62. That is, when the drive motor 20 rotates one revolution, the roller member 46 moves from the valley portion 66 to the peak portion 68 on one cam profile 64 and then to the valley portion 66 on the neighboring cam profile 64. The position determining module 25 includes the first and second parts 26 and 27, each having a sector shape. If the first and second parts 26 and 27 are combined with each other, a circle is formed. A first terminal 28 electrically connected to the power supply 80 is positioned at the first part 26, and a second terminal 29 is positioned at the motor housing 21. The second terminal 29 is disposed to contact one of exterior circumferences of the first and second parts 26 and 27. In addition, the first part 26 and the second part 27 are electrically isolated from each other, and the first part 26 or the second part 27 is electrically conductive. That the second terminal 29 contacts with the second part 27 corresponds to that the roller member 46 is positioned at the valley portion 66 on the cam profile 64, and that the second terminal 29 contacts with the first part 26 corresponds to that the roller member 46 is positioned at a portion other than the valley portion 66 on the cam profile 64. That is, the second part 27 corresponds to the valley portion 66 on the cam profile 64 and the first part 26 corresponds to the portion other than the valley portion 66 on the cam profile 64.

If the second terminal 29 contacts with the first part 26, a closed circuit is formed between the power supply 80 and the drive motor 20 through the position determining module 25 so that electric power is supplied to the drive motor 20, but if the second terminal 29 contacts with the second part 27, an open circuit is formed between the power supply 80 and the drive motor 20 so that the electric power is not supplied to the drive motor 20. Therefore, if the roller member 46 is not positioned at the valley portion 66 on the cam profile 64 the electric power is supplied to the drive motor 20 to operate the drive motor 20, but if the roller member 46 is positioned at the valley portion 66 on the cam profile 64 the electric power is not supplied to the drive motor 20 so that the drive motor 20 is not operated.

As shown in FIG. 12, a power supply circuit includes the power supply 80, an operation switch 82, the drive motor 20, and the position determining module 25.

The operation switch 82 includes an ON terminal 84 and an OFF terminal 86, and the power supply 80 is configured to supply the electric power to the drive motor 20 through the ON terminal 84 of the operation switch 82 and further configured to supply the electric power to the drive motor 20 through the OFF terminal 86 of the operation switch 82 and the first part 26 of the position determining module 25. If the power supply 80 is connected to the OFF terminal 86 of the operation switch 82 and the second part 27 of the position determining module 25, the electric power is not supplied to the drive motor 20. Therefore, even if the user turns off the operation switch 82 (i.e., even if the power supply 80 is connected to the OFF terminal 86 of the operation switch 82), the drive motor 20 continues to operate if the roller member 46 is not positioned at the valley portion 66 on the cam profile 64 (i.e., the second terminal 29 contacts with the first part 26). Therefore, if the massage device 10 is not operated, the sliding member 40 is always positioned at a position farthest from the seated occupant.

FIG. 11 and FIG. 12 show one example of the position determining module 25 and the power supply circuit, but the exemplary embodiments of the present invention are not limited to the position determining module 25 and the power supply circuit illustrated in FIG. 11 and FIG. 12. For example, when the massage device 10 is not operated, the position determining module and the power supply circuit that allow the sliding member 40 to be always positioned at the position farthest from the seated occupant can be implemented in various ways, and should be interpreted as being included in the scope of the present invention.

Figure 13:
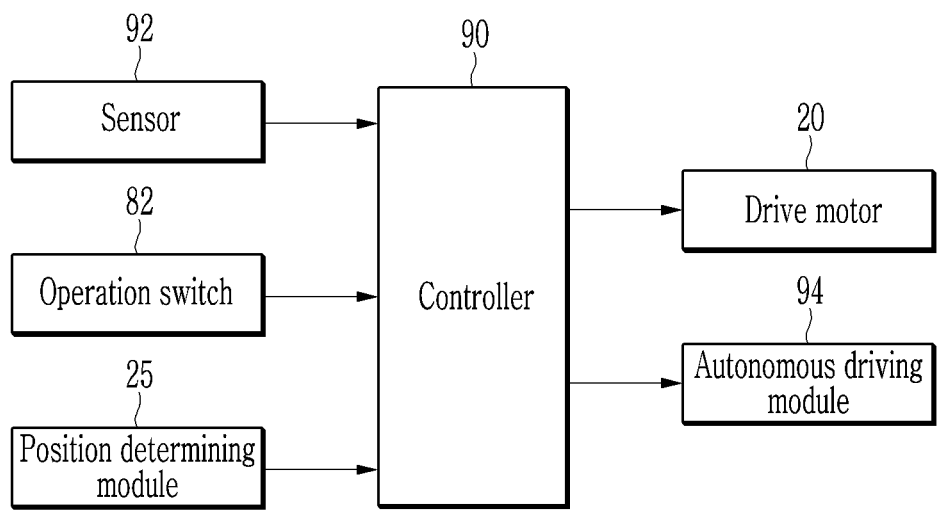
FIG. 13 is a block diagram of a massage system according to an exemplary embodiment of the present invention.

FIG. 13 is a block diagram of a massage system according to an exemplary embodiment of the present invention.

As shown in FIG. 13, the massage system according to an exemplary embodiment of the present invention includes a sensor 92, the operation switch 82, the position determining module 25, a controller 90, and the drive motor 20. In addition, in a case that the massage system is applied to an autonomous vehicle, the massage system further includes an autonomous driving module 94.

The sensor 92 may be a motion sensor that detects a movement of the driver or the occupant, or a blink of the driver's eye or the occupant's eye, or a sensor that detects a brainwave of the driver or the occupant. For example, the sensor 92 may be one or more of a variety of sensors that can detect that the driver is sleepy. The sensor 92 transmits a signal corresponding to the detected value to the controller 90.

The operation switch 82 includes the ON terminal 84 and the OFF terminal 86. A user can operate the massage device 10 by selecting the ON terminal 84 and stop the massage device 10 by selecting the OFF terminal 86. The operation switch 82 transmits a signal corresponding to the terminal selected by the user to the controller 90. In some exemplary embodiments, the operation switch 82 can be automatically operated by the controller 90. For example, if the vehicle is automatically operated at the relax mode, the controller 90 can connect the power supply 80 to the ON terminal 84, and if the vehicle is automatically released from the relax mode, the controller 90 can connect the power supply 80 to the OFF terminal 86.

The position determining module 25, as described above, detects a position at which the roller member 46 is positioned on the cam profile 64 and transmits a signal corresponding to the position to the controller 90. For example, the position determining module 25 connects the power supply 80 to the drive motor 20 if the second terminal 29 contacts with the first part 26, and does not connect the power supply 80 to the drive motor 20 if the second terminal 29 contacts with the second part 27.

The controller 90 determines an operation mode of the vehicle based on the signals from the sensor 92, the operation switch 82, and/or the position determining module 25, and controls the drive motor 20 and the autonomous driving module 94 according to the operation mode. For this purpose, the controller 90 may include a memory configured to store program instructions, and a processor configured to execute the program instructions to perform processes of a method according to an exemplary embodiment of the present invention. Here, the operation mode of the vehicle includes an autonomous driving mode at which the vehicle can move by itself without driver's manipulation, a manual mode at which the driver manually operates the vehicle, and the relax mode at which the seat 1 and the massage device 10 are controlled so that the driver (or other occupant) can relax.

The drive motor 20 operates the massage device 10 by the control of the controller 90.

The autonomous driving module 94 is a module supporting the autonomous driving mode of the vehicle. For example, the autonomous driving module 94 may include a module controlling a steering wheel, a module controlling a driving torque, a module controlling braking, and/or a module controlling a suspension system.

Figure 14:
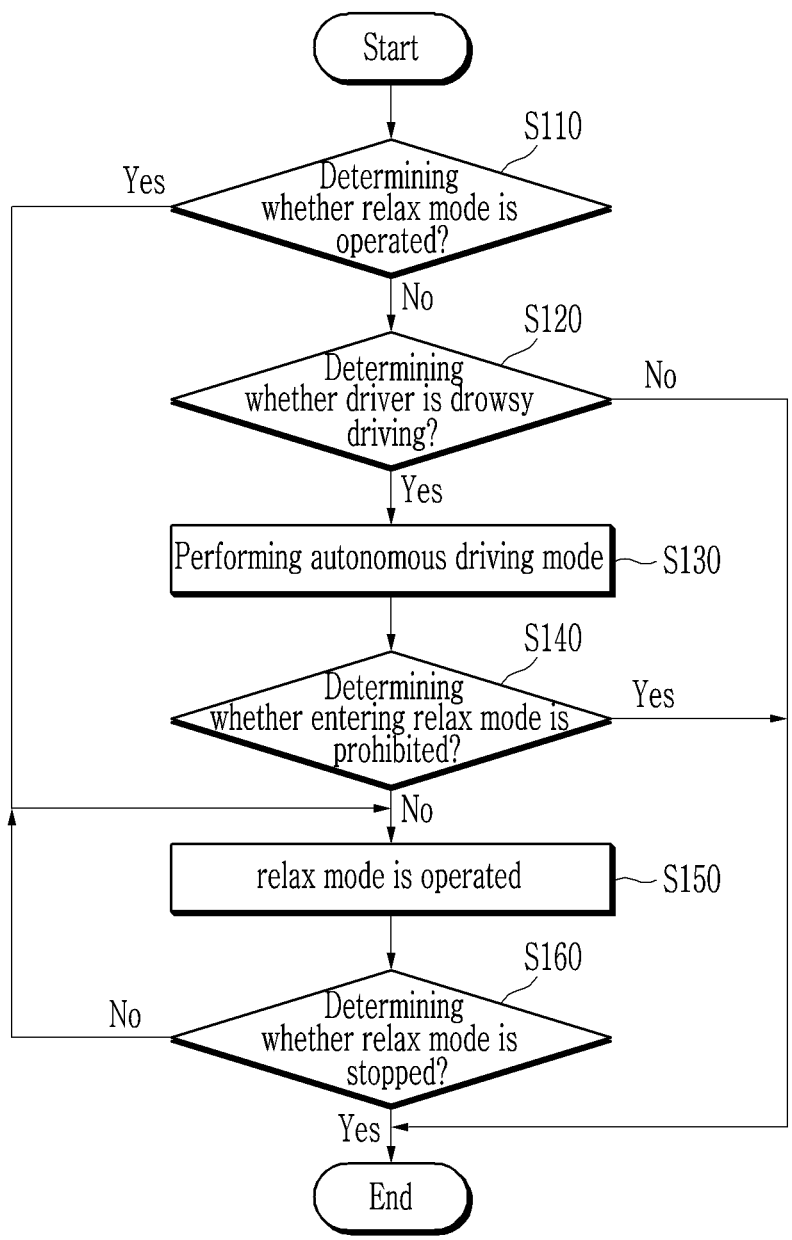
FIG. 14 is a flowchart of a method of controlling a massage system according to an exemplary embodiment of the present invention.

FIG. 14 is a flowchart of a method of controlling a massage system according to an exemplary embodiment of the present invention.

As shown in FIG. 14, a method of controlling the massage system starts when the occupant sits on the seat 1. For example, when a weight sensor (not shown) mounted at the seat 1 detects the occupant sits on the seat 1, the controller 90 determines whether the occupant operates the relax mode at step S110. For example, if the occupant selects the ON terminal 84 of the operation switch 82, the controller 90 can determine that the occupant operates the relax mode.

If it is not determined that the occupant does not operate the relax mode (e.g., it is determined that the occupant selects the OFF terminal 86 of the operation switch 82) at the step S110, the controller 90 determines whether the driver is drowsy driving through the sensor 92 at step S120. As described above, the sensor 92 can determine whether the driver is drowsy by detecting the movement, the eye blinking, and/or the brain waves of the driver. Since a method of determining whether the driver is drowsy driving is well known to a person of ordinary skill in the art, detailed description thereof will be omitted.

If it is determined that the driver is not drowsy driving at the step S120, the controller 90 finishes the method of controlling the massage system.

If it is determined that the driver is drowsy driving at the step S120, the controller 90 enters the autonomous driving mode at step S130. Therefore, the controller 90 operates the vehicle through the autonomous driving module 94 at the autonomous driving mode.

After that, the controller 90 determines whether entering the relax mode is prohibited at step S140. For example, the driver or the occupant may not want the operation of the massage device 10 at the autonomous driving mode. Therefore, if the driver or the occupant chooses to prohibit the entry into the relax mode through an additional switch, the controller 90 finishes the method of controlling the massage system without entering the relax mode. Therefore, the vehicle is operated at the autonomous driving mode.

If the entry into the relax mode is not prohibited at the step S140 or it is selected at the step S110 that the vehicle is operated at the relax mode, the controller 90 operates the vehicle at the relax mode at step S150. That is, the controller 90 connects the power supply 80 to the ON terminal 84. For example, the controller 90 can adjust a slope of a backrest of the seat 1, and operate the massage device 10 at the relax mode. The massage device 10 may be operated for a predetermined period, and when the predetermined period has elapsed, the operation of the massage device 10 may be automatically terminated. In addition, after a predetermined pause time has elapsed, the massage device 10 may be automatically operated again. The massage device 10, as described above, can be operated by supplying the electric power to the drive motor 20.

After that, the controller 90 determines whether the relax mode is stopped at step S160. For example, if the driver or the occupant selects the OFF terminal 86 of the operation switch 82, or the controller 90 determines that a predetermined relax mode stop condition is satisfied and connects the power supply 80 to the OFF terminal 86 of the operation switch 82, the controller 90 determines that there is a request to stop the relax mode and stops the relax mode. Here, the non-limiting predetermined relax mode stop condition may be satisfied when the occupant selects the manual mode or when a predetermined relax mode operation period has elapsed. As described above, even though the power supply 80 is connected to the OFF terminal 86 of the operation switch 82, the drive motor 20 continues to be operated if the roller member 46 is not positioned on the valley portion 66 of the cam profile 64 (i.e., the second terminal 29 contacts with the first part 26). Thereafter, if the drive motor 20 continues to rotate so that the second terminal 29 contacts with the second part 27 (i.e., the roller member 46 is positioned at the valley portion 66 on the cam profile 64), the drive motor 20 is stopped. Therefore, the massage device 10 always stops only when the sliding member 40 is positioned at the position farthest from the seated occupant, thereby minimizing the discomfort of the seated occupant.

On the other hand, it is exemplified in this specification that the drive gear module 70 operably connected to the drive motor 20 is operably connected to the sliding member 40 so that the drive gear module 70 rotates the sliding member 40 when the torque is input from the drive motor 20. However, the drive gear module 70 operably connected to the drive motor 20 may be operably connected to the housing member 60 so that the drive gear module 70 may rotate the housing member 60 when the torque is input from the drive motor 20. In this case, the second pillar 72 of the drive gear module 70 is inserted into the first pillar 50 of the sliding member 40, but the second pillar 72 is relatively rotatable to the first pillar 50. That is, the drive gear module 70 does not supply the torque to the sliding member 40. Instead, the housing member 60 receiving the torque from the drive motor 20 rotates, and therefore the roller member 46 of the sliding member 40 can move on the cam profile 64. Therefore, the sliding member 40 does not rotate, but can reciprocate in the length direction corresponding to cam profile 64.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A massage system for a seat of a vehicle, comprising:
   a drive motor;
   a sliding member having a hollow pillar shape, a first end of the sliding member being blocked by a plate member and a second end of the sliding member being opened;
   a housing member having a hollow pillar shape, a first end of the housing member being blocked by a partition and a second end of the housing member being opened; and
   a drive gear module operably connected to the drive motor and configured to receive torque of the drive motor and to provide the torque to one of the sliding member and the housing member in order to rotate the one of the sliding member and the housing member;
   wherein at least one roller member is extended toward the housing member at an edge of the plate member, and at least one cam protruding toward the sliding member is formed at a circumference of the partition; and
   wherein a cam profile is formed at a surface of the cam facing toward the sliding member along a circumferential direction of the cam, and the roller member is configured to move on the cam profile when the sliding member or the housing member rotates such that the sliding member is moved towards or away from a seated occupant.

2. The massage system of claim 1, wherein at least one bearing is provided at a free end portion of the roller member contactable on the cam profile.

3. The massage system of claim 1, further comprising a first pillar extending toward the housing member from a central portion of the plate member, wherein the drive gear module is provided with a second pillar extending toward the sliding member, and the second pillar penetrates through the partition and is connected to the first pillar to be capable of transmitting the torque to the first pillar.

4. The massage system of claim 3, wherein the first pillar and the second pillar are coupled to be capable of transmitting the torque to each other and sliding with each other.

5. The massage system of claim 1, wherein the drive gear module includes a drive gear, the drive motor includes a motor shaft formed with a worm, and the drive gear and the worm are coupled in a way of a worm gear.

6. The massage system of claim 1, further comprising a power supply circuit configured to supply electric power to the drive motor, wherein:
   when the drive motor supplies the torque to the drive gear module, the sliding member is configured to reciprocate between a first position closest to the seated occupant and a second position farthest from the seated occupant; and
   the power supply circuit is configured to stop the drive motor when the sliding member is positioned at the second position.

7. The massage system of claim 6, wherein the cam profile is defined by a displacement from the partition to the surface of the cam and includes a valley portion and a peak portion, and wherein the displacement increases along a predetermined curved line from the valley portion to the peak portion and decreases along a predetermined curved line from the peak portion to a valley portion of a neighboring cam profile in one cam profile such that the cam profile is formed convex toward the sliding member.

8. The massage system of claim 7, wherein the power supply circuit includes a position determining module configured to connect a power supply to the drive motor when the roller member is positioned at a position other than the valley portion on the cam profile, and disconnect the power supply from the drive motor when the roller member is positioned at the valley portion on the cam profile.

9. The massage system of claim 8, wherein the position determining module includes:
   first and second parts connected to a motor shaft of the drive motor, the first and second parts electrically isolated from each other and configured to rotate with the motor shaft;

a first terminal electrically connecting the power supply to the first part; and a second terminal contactable with the first part or the second part according to rotation of the motor shaft to electrically connect the power supply to the first part or the second part; and wherein the second terminal contacts with the first part to connect the power supply to the drive motor when the roller member is positioned at the position other than the valley portion on the cam profile, and the second terminal contacts with the second part to disconnect the power supply from the drive motor when the roller member is positioned on the valley portion on the cam profile.

10. The massage system of claim 9, wherein the power supply circuit further comprises an operation switch including an ON terminal and an OFF terminal, and wherein the ON terminal is capable of directly connecting the power supply to the drive motor and the OFF terminal is capable of connecting the power supply to the drive motor through the position determining module.

11. The massage system of claim 10, further comprising a controller configured to control an operation of the drive motor, wherein the controller is configured to connect the power supply to the ON terminal at a relax mode.

12. The massage system of claim 11, wherein the controller is configured to connect the power supply to the OFF terminal at a mode other than relax mode.

13. The massage system of claim 12, wherein the roller member is positioned at the valley portion on the cam profile at the mode other than the relax mode.

14. A vehicle, comprising:
a vehicle seat;
a massage unit provided in the vehicle seat, the massage unit configured to apply a massage pressure to an occupant of the vehicle seat;
a drive motor operably connected to the massage unit and configured to provide a torque to the massage unit, the drive motor including a motor shaft formed with a worm;
a power supply circuit configured to supply electric power to the drive motor;
wherein the massage unit includes:
a sliding member having a hollow pillar shape, a first end of the sliding member being blocked by a plate member and a second end of the sliding member being opened,
a housing member having a hollow pillar shape, a first end of the housing member being blocked by a partition and a second end of the housing member being opened,
a drive gear module operably connected to the drive motor and configured to receive the torque of the drive motor and to provide the torque to one of the sliding member and the housing member in order to rotate the one of the sliding member and the housing member, the drive gear module including a drive gear, wherein the drive gear and the worm of the motor shaft are coupled,
a roller member extended toward the housing member at an edge of the plate member, and
at least one cam protruding toward the sliding member formed at a circumference of the partition,
wherein a cam profile is formed at a surface of the cam facing toward the sliding member along a circumferential direction of the cam, and the roller member is configured to move on the cam profile when the sliding member or the housing member rotates such that the sliding member is moved towards or away from the occupant, and
wherein the cam profile is defined by a displacement from the partition to the surface of the cam and includes a valley portion and a peak portion, and wherein the displacement increases along a predetermined curved line from the valley portion to the peak portion and decreases along a predetermined curved line from the peak portion to a valley portion of a neighboring cam profile in one cam profile such that the cam profile is formed convex toward the sliding member.

15. The vehicle of claim 14, further comprising a first pillar extending toward the housing member from a central portion of the plate member, wherein the drive gear module is provided with a second pillar extending toward the sliding member, and the second pillar penetrates through the partition and is connected to the first pillar to be capable of transmitting the torque to the first pillar.

16. The vehicle of claim 14, wherein:
when the drive motor supplies the torque to the drive gear module, the sliding member is configured to reciprocate between a first position closest to the occupant and a second position farthest from the occupant; and
the power supply circuit is configured to stop the drive motor when the sliding member is positioned at the second position.

\* \* \* \* \*